C. & W. KIRKPATRICK.
Coffee-Pot.
No. 218,384. Patented Aug 12, 1879.
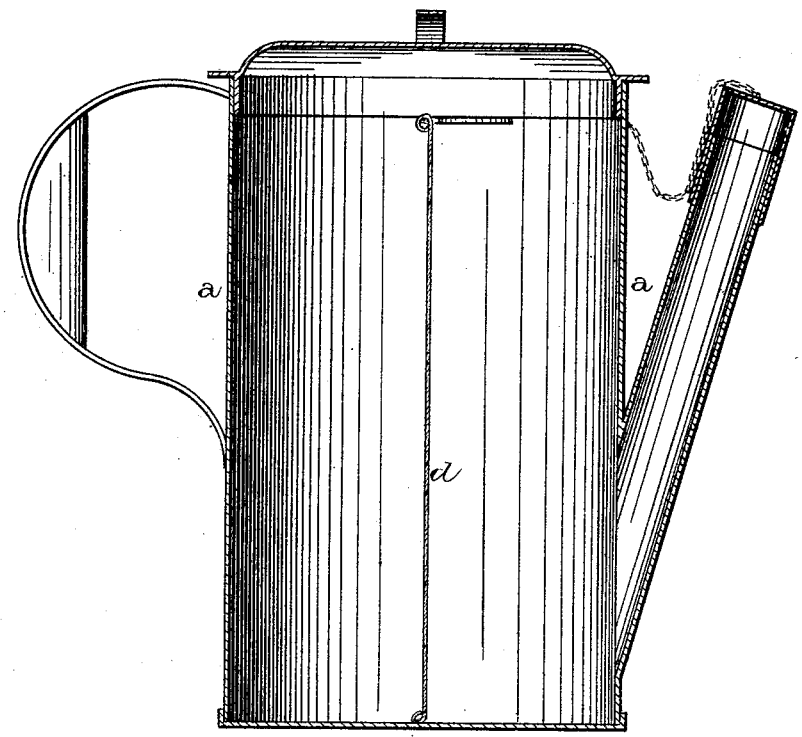
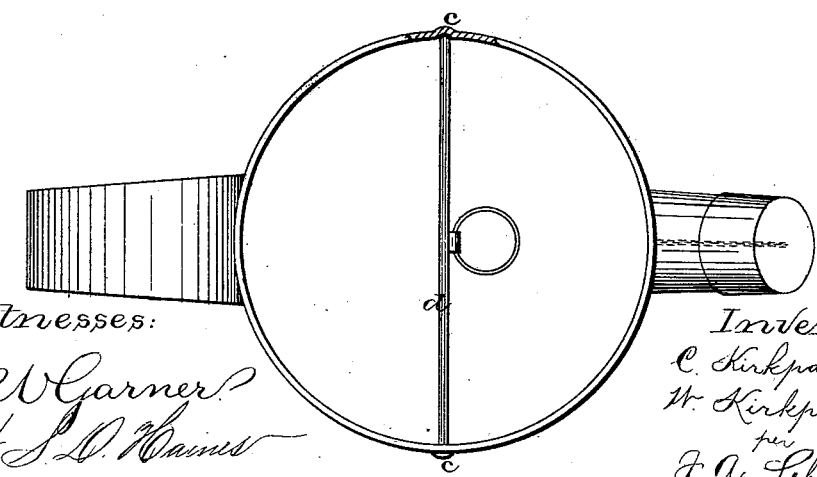

UNITED STATES PATENT OFFICE

CORNWALL KIRKPATRICK AND WALLACE KIRKPATRICK, OF ANNA, ILL.

IMPROVEMENT IN COFFEE-POTS.

Specification forming part of Letters Patent No. 218,384, dated August 12, 1879; application filed June 7, 1879.

*To all whom it may concern:*

Be it known that we, CORNWALL KIRKPATRICK and WALLACE KIRKPATRICK, of Anna, in the county of Union and State of Illinois, have invented certain new and useful Improvements in Coffee-Pots; and we do hereby declare the following to be a full, clear, and exact description of the invention, such as will enable others skilled in the art to which it pertains to make and use it, reference being had to the accompanying drawings, which form part of this specification.

Our invention relates to an improvement in coffee-pots having vertical wire sieves arranged to divide them into two portions.

The said invention consists in providing such coffee-pots with vertical grooves formed in the metal of the pots, and extending from the tops to the bottoms thereof, so as to form guides for said sieves and brace and hold the same in vertical position, as hereinafter set forth.

Figure 1 is a vertical section of our invention, and Fig. 2 is a plan view of the same.

*a* represents a coffee-pot of any suitable construction, shape, or size. Down the center of its two opposite sides are made the grooves, guides, or ways *c*, in which is slid the strainer *d*. This strainer may consist of a wire frame, and be covered over with some flexible material, as here shown, or may be made entirely of metal, as may be preferred, and serves to divide the pot into two halves or portions.

In that half or portion which is opposite to and divided from the spout by this strainer is placed the ground coffee.

When the water is poured in the pot it circulates freely through the sieve, and extracts the strength of the coffee as freely as though no sieve or strainer was used. The grounds are all kept on one side of the pot, and when the coffee is being poured out no grounds can escape with it.

When it is desired to wash the pot it is only necessary to pull the strainer out and the pot is left perfectly clear, and, no matter how far the pot may be turned over in pouring out the coffee, there is no danger of the grounds coming out at the top. As the strainer consists of only a wire frame and a cloth stretched over it, and as the grooves or guides are formed in the sides of the pot, it is quite evident that the addition of the screen will cost but a trifle.

We are aware that coffee-pots have been provided with strainers, and with a guide-flange or band at the top of the coffee-pot on the inside thereof, said band being recessed to receive the vertical strainer and guide and brace the upper part thereof, and such construction we disclaim.

What we claim, and desire to secure by Letters Patent, is—

The combination, with removable vertical strainer *d*, of coffee-pot *a*, formed with vertical grooves or guideways *c c*, arranged opposite to one another, and extending from the top to the bottom of the coffee-pot, so as to brace all parts of the strainer and hold it in vertical position, substantially as set forth.

In testimony that we claim the foregoing we have hereunto set our hands this 2d day of June, 1879.

CORNWALL KIRKPATRICK.
  WALLACE KIRKPATRICK.

Witnesses:
 C. E. KIRKPATRICK,
 FRANK KIRKPATRICK.